United States Patent [19]

Baus

[11] Patent Number: 4,831,367
[45] Date of Patent: May 16, 1989

[54] INFORMATION DEVICE

[76] Inventor: Heinz G. Baus, 35, Wartbodenstrasse, CH-3626 Hünibach-Thun, Switzerland

[21] Appl. No.: 244,634

[22] Filed: Sep. 12, 1988

Related U.S. Application Data

[63] Continuation of Ser. No. 813,235, Dec. 24, 1985, abandoned.

[30] Foreign Application Priority Data

Dec. 29, 1984 [DE] Fed. Rep. of Germany ....... 3447824

[51] Int. Cl.[4] ............................ G09G 1/16; H04N 5/76
[52] U.S. Cl. ..................................... 340/711; 340/706; 340/799; 360/12; 360/72.2
[58] Field of Search ............... 340/721, 723, 725, 748, 340/799, 712, 706, 711; 360/12, 72.2

[56] References Cited

U.S. PATENT DOCUMENTS

| Re. 32,115 | 4/1986 | Lockwood et al. | 360/12 |
|---|---|---|---|
| 4,303,973 | 12/1981 | Williamson, Jr. et al. | 340/711 |
| 4,395,740 | 7/1983 | Yuen et al. | 360/33.1 |
| 4,445,187 | 4/1984 | Best | 340/725 |
| 4,449,198 | 5/1984 | Kroom et al. | 360/72.2 |
| 4,451,701 | 5/1984 | Bendig | 340/711 |
| 4,599,611 | 7/1986 | Bowker et al. | 340/745 |
| 4,634,386 | 1/1987 | Tamaki | 360/72.2 |

FOREIGN PATENT DOCUMENTS 3304859 8/1984 Fed. Rep. of Germany .

OTHER PUBLICATIONS

Lange, "Optische Datenspeicher" (Optical Data Stores) *Elektronik* Jan. 13, 1984, pp. 27-30.
Bildschirmtext, Beschreibung und Anwendungs-moeglichkeiten (Videotext, Description and Applications), Deutsche Bundespost pp. 8-10 and 24-29.
Kreiner, "Durch Btx gezielt informiert"(Targeted Information through Btx), *Siemens Data Report,* vol. 19, No. 5, pp. 34-37, (1984).
Pergamon International Information Corporation, "An Invitation to Subscribe to VIDEO PATSEARCH ™", Brochure, Great Britain.

*Primary Examiner*—Gerald L. Brigance
*Attorney, Agent, or Firm*—Foley & Lardner, Schwartz, Jeffery, Schwaab, Mack, Blumenthal & Evans

[57] ABSTRACT

An information device is provided with a storage unit for storing information, with an input element comprising keys, with a memory including a plurality of memory locations, with a computer, and with a unit connected to the storage unit to display the information stored therein. Command sequences which can predetermined are stored in the memory locations in the form of status blocks, the computer having access to the command sequence in each status block. Memory locations in the respective status blocks are associated with the keys so that when one of the keys is actuated, the associated memory location in the status block actually called up by the computer is activated to release an address signal which is used by the computer to control release of information from the storage unit, which released information is displayed through the display unit. The information stored in the storage unit may be used for sales promotion, and may contain details about a product or the like.

19 Claims, 3 Drawing Sheets

INFORMATION DEVICE

This application is a continuation of application Ser. No. 813,235, filed Dec. 24, 1985, now abandoned.

The present invention relates to a device provided with a storage unit for storing information, with an input element comprising keys or the like, with a memory including a plurality of memory locations, and with a computer which is contained in a control unit, in order to activate the memory by actuating a key and to show the information on a display unit.

In supermarkets and department stores, information regarding the products on sale, their locations and their applications, is imparted to customers mainly by sales persons or sales counselors. In the case of exhibitions, airports or railroad stations, there is a need to impart information regarding locations, destinations, railroad or flight connections. There is often no personnel to provide the customers or users with the very wide range of information required quickly and in a comprehensive manner. There is also the question concerning the cost of such personnel. For this reason, sales promotion systems are already known which comprise video recorders or laser video disc units for the storage of information, the stored information being presented to the user by means of a monitor. In a system of this type, if the information is offered continuously and with no possibility of active intervention, the user remains passive and his attention soon flags. Such systems are therefore neither very effective nor efficient.

German OS No. 33 04 859 describes a circuit arrangement for feeding in, and selectively changing or correcting, texts, graphics, or the like. This device is used for the video text and includes, as an input unit, a "keyboard" with alpha numerical and functional keys. These functional keys are used to call up corresponding information stored in a coding memory. By means of an "editor", the locations in the coding memory are associated with the information being entered from a keyboard table. The information stored in the different locations of the coding memory are released in code from a BTX decoder. Such a known device allows to feed into the display unit, by means of the keyboard, a plurality of special characters, colours, etc. with the current BTX text. However, this known device is not suitable for releasing information regarding a product or the like, since it cannot be operated by a user who has no previous knowledge thereof. It is also impossible to present picture sequences, especially spot advertisements, to an observer by means of the display unit.

A brochure issued by Pergamon International Information Corp., describes a computer system which locates and displays both texts and drawings. This system comprises a video disc unit and is particularly useful in searching for patents. The desired pages of the video discs may be interrogated by actuating the keys of a keyboard. However, this system cannot offer picture sequences continuously one after the other, as required for a spot advertisement, for example. Moreover, an "on-line" connection to a data bank is needed so as to obtain access to the entire stock of patent documents. This system is not intended for sales promotion of for releasing to a customer information relative to specific products.

An object of the present invention is therefore to develop a device, of the type mentioned at the beginning of the present disclosure, in such a manner that the user is approached in optimal fashion and can actively influence the release of information. Without any prior knowledge, the user of such a device is to be in a position to actuate the device and to establish a dialogue therewith. Incorrect operation, which may very easily occur when several numbers are fed in, is to be prevented, and a fast and reliable access to the desired information is to be assured. The device is to be adaptable at low cost to given operating conditions, predominant use being made of structural components which are commercially available on the market. Control is to be effected with low cost components, and it is to be possible to adapt at low cost the device to the information carrier in use, which is advantageously a video disc. The device is to be able to provide the user, in a clear and distinct manner, both with an initial review of the products and objects offered, and with a layout, etc., and to supply the desired detailed information upon request.

In order to carry out into practice this object, it is proposed that command sequences which can be predetermined and which are stored in memory locations be provided as status blocks which can be interrogated by a computer; that corresponding memory locations be associated, in the respective status blocks, with a plurality of keys; that when one of the keys is actuated, the associated memory location in the status block actually called up by the computer, be activated to release and address signal out of the block, in particular to interrogate another status block; and that, furthermore, the information stored in the storage unit, serving as sales promotion or containing details regarding a product or the like, be called up.

The device according to the invention is characterized by a functional design and, in a particularly simple manner, it provides rapid access to, and selection of, information desired by the user. The proposed information and display system, covering products, processing instructions, locations or the like, is relatively inexpensive, especially since the storage unit is preferably in the form of a commercially available laser video disc unit and the display unit is in the form of a conventional television set or monitor. Mechanico-electronic VHD video discs, video recorders, or the like may also be used within the scope of the invention. An input element may be in the form of a simple keyboard and it is not necessary to feed in multi-digit numbers. On the contrary, an input of the device may be effected by actuation of a single key. Since an address of the section of the video disc to be activated with the video disc unit does not need to be fed in with the input element, errors caused by incorrect inputs are avoided. If, for example, a selection of different products, different locations, or the like, is displayed on the screen of a monitor, a number from 0 to 9, or a corresponding letter is associated with each choice. After the desired single key of the input element has been actuated, an input signal is fed to a control unit. An association of the actuated key with a corresponding address stored in the memory from which the desired address signal is delivered, is carried out by means of an interrogator unit. The address signals to be selected are located in a list stored in the memory after the address signal for the selection display, a clear coordination being thus obtained. The address signal associated with the selection made through actuation of a key is called up, and the picture, or picture sequence associated therewith is then shown of the display unit.

In one particular embodiment, the address signals of pictures that can be called up are stored in a memory, especially that of the control unit, according to a predetermined hierarchy of their sequence, in such a manner that a user can call up the picture immediately following or the picture just displayed. By activating the memory through the input element, a user can again call up pictures already seen, for example in order to obtain, in addition to information already received regarding a specific product, parallel information regarding a comparable product. By means of the computer, which is preferably in the form of a microprocessor, the memory and the addresses or functional signals listed in the same are interrogated consecutively. In addition to this, so-called pointers can be used, so that subsequent memory locations in the memory can be jumped over or moved back. For instance, if the functional signal for determining the key actuated is fed to the interrogator unit, and the key is thus determined, the address associated therewith is jumped over by a pointer associated with the key in order to start a picture sequence, for example. The address memory in the control unit can be activated by means of the input element in order to call up the next picture, or picture sequence, from the storage unit. For example, if the picture displayed on the screen is of no interest to the user, or if he has already evaluated the information, he can switch to the next picture by direct use of the input element. The user's interest is thus maintained uninterruptedly and he does not tire of a presentation which is unduly long and that he does not want.

According to one particular embodiment of the present invention, an intermediate memory is provided from which audio or textual information can be called up and can be fed to an output element through a mixing stage, such an intermediate memory being adapted to be activated by means of the address or functional signals. In this surprisingly simple way, it is possible, if necessary, to fade-in additional information even subsequently, with no need to prepare a new video disc or similar storage medium. This advantageous configuration also makes it possible to dub audio signals into a still picture. It is desirable for these audio signals also to be stored in the storage medium, for example in the video disc, between the individual pictures. If, after the device has been started, a picture sequence is run off first of all, the audio signals can be simultaneously re-recorded in the intermediate memory. If a still is then displayed on the monitor, the desired audio signal will be called up from the intermediate memory. Lines free from video signals according to known television standards can be used for audio signals which, after intermediate storage, can be interrogated again and released simultaneously with the still associated therewith.

According to a particular development of the present invention, a standardized interface, which is advantageously a V-24 interface, is provided between the storage unit and the control unit. It is apparent that the device according to the invention can be built up from commercially available components, to fit television sets, monitors and laser video disc units, with the substantial cost advantages associated therewith.

Accordingly, the present invention proposes an information device comprising:

a storage unit for storing information;

an input element provided with a plurality of selection members;

a memory including a plurality of memory locations in which command sequences which can be predetermined are stored in the form of status blocks, memory locations in the respective status blocks each storing and address signal and being respectively associated with corresponding ones of said selection members;

means connected to said input element and to said memory for causing release, out of one of the status blocks actually called up by a computer, of the address signal stored in one memory location of said one block associated with one of the selection members, in response to actuation of said one selection member;

said computer connected to said memory to have access to said command sequences of the status blocks and to be responsive to said released address signal, in order to control release of information from the storage unit; and a display unit connected to the storage unit to display the information released from said storage unit.

The invention is described in greater the following non-restrictive description of a preferred embodiment thereof, made with reference to the accompanying drawings; in which.

Figure 1:
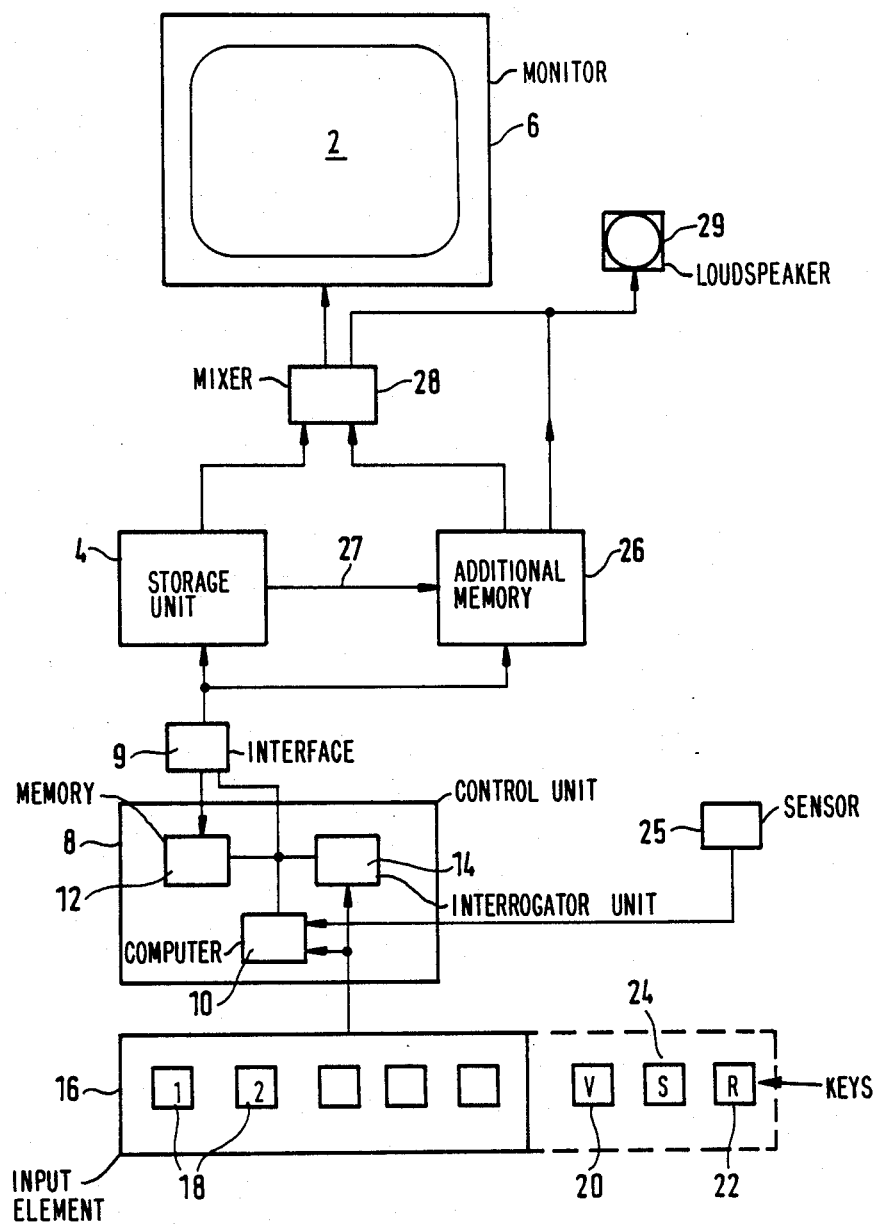
FIG. 1 is a basic, block diagram of a device according to the present invention.

FIG. 1 illustrates a display screen 2 of a monitor 6 on which information can be displayed in known fashion. This information can be offered in the form of still pictures or continuous pictures, for example in the form of a spot advertisement. The monitor 6 including the screen 2 receives the information from a storage unit 4, which is preferably in the form of a laser video disc unit. The information is stored on the video disc in a plurality of sections so that, it is possible by an appropriate control to obtain a continuous release, like a film, or merely a still. A number is also associated with each individual picture of the video disc; it is known that conventional video discs can contain up to 54,000 individual pictures.

The storage unit 4 is connected to a control unit 8, an interface 9, preferably a standardized V-24 interface, being connected between these storage and control units 4 and 8. The control unit 8 contains an address memory 12 by means of which the relevant sections or individual pictures in the storage unit 4 can be called up. The address memory 12 may be an EPROM or some other erasable programmable-read-only-memory. The memory 12 may also be replaceable, so that, if necessary, a programmed memory, corresponding to the relevant storage unit 4, can be used. However, addresses can also be stored directly in the storage unit 4 so that, if necessary, they can be interrogated by the control unit 8 and read into the memory 12. If the address memory 12 is located in the control unit 8, changes are relatively easy to make. Such a control unit 8 also contains a computer 10, in this case in the form of a microprocessor. The content of the memory 12 is processed successively by the computer 10. Addresses and functional signals are listed consecutively in the memory 12 and, after the device has been switched on and started up, the listed signals are called up consecutively by means of this computer 10. By means of address signals corresponding to the section and picture numbers, the desired picture or picture sequence is called up from the storage-unit 4 and displayed on the screen 2 of the monitor 6. It is important that addresses associated with the respective hereinafter described keys be listed consecutively in the memory 12, so that the corresponding associated addresses in the list may be called up by means of branches, pointers, or jump instructions.

An interrogator unit 14 is connected both to the memory 12 and to an input element 16 comprising keys 18. Capacitative sensors or the like may of course replace the keys 18. It is to be understood that, if necessary, another signal, corresponding to the address signal of the picture presented on the screen 2, can also be fed to the interrogator unit 14. It is important that there exists a specific coordination between the picture displayed on the screen 2 and the address or other signal. It is also important that so-called status-blocks be fed to the memory 12 which, in a particularly clear and simple manner ensures input of the signals and the processing thereof. Each status block is basically of the same design, memory locations being occupied consecutively by a plurality of functions such as: still picture, picture sequence, key interrogation, key 1, key 2, etc.. The list, and thus the relevant status block, are processed by means of the computer 10, appropriate functional signals being fed to the storage unit 4 and also to the interrogator unit 14 according to the address, still picture, picture sequence or key interrogation. The list and status block also contain data relating to the respective possible keys, in order to detect incorrect input. For instance, if only 6 possibilities are associated with a selection which is displayed at a certain moment, the desired picture or picture-sequence can be produced only by actuating keys 1 to 6 through a corresponding pointer. Actuating the eighth key causes an error message to be released. If an admissible key, for example the fourth key, is actuated, the computer 10 initially interrogates the memory locations associated with the keys 1 to 3, the comparison being carried out in the interrogator unit 14. Thereafter, the associated address of the pointer is determined, based upon the matching of the input signal of the fourth key, in order to branch off to the associated address in the memory 12 by means of computer 10.

The address of the block of a superimposed branch is associated with a special key, preferably the zero key. This is a simple way of jumping back to the superimposed branch in the hierarchy of the listed addresses. In other words, a selection display previously presented is again called up by the user by actuating the zero key. It is thus possible to present, on the display screen 2, a selection display, for example for different products, different locations, or different destinations, a number for example from 1 to 9 being associated with the relevant product, location or destination. If a user now desires additional information regarding the product, the location or the destination, he needs merely to depress a key 18 on the input element 16 provided with a corresponding number, in order to release a corresponding signal to the interrogator unit 14. The latter thus coordinates the selected product, location, or the like with the selection display just presented. Consequently, there is no need for the user to feed in the section number or section code directly by means of the input element 16. He has only to feed in a single number, thus substantially reducing operating errors and substantially simplifying the operation as a whole.

In order to enable the user to advance the display, according to another configuration of the device, an additional key 20 is arranged upon the input element 16 in order to provide direct forward movement. This is effected by actuating the key 20 by means of which the address memory 12 is activated directly and calls up the next picture, or picture sequence, from the storage unit 4. The input element 16 also contains a key 22 by means of which a user may also call up a picture already seen, through the control unit 8 including the address memory 12. Finally, a stop key 24 is provided is order to terminate the operation and, at the same time, to reach the beginning of the operation plan as a whole.

Connected to the control unit 8 is an additional memory 26 in which further textual or audio signals are stored. This memory makes it possible also to feed in text fade-ins, especially for new models, altered performance data etc., thus making the device extremely flexible. Signals from the additional memory 26 are fed to a mixer 28, in order to be released to the monitor 6 either mixed with, or chronologically relocated in relation to the information in the storage unit 4. Also provided is a loudspeaker 29 by means of which audio signals can be released. This loudspeaker 29 may be fed either directly from the additional memory 26 or also through the mixer 28. A sensor 25 is connected to the control unit 8 and may be used to activate the computer 10. Such a sensor is preferably an infrared sensor or a light barrier, and is used to detect a potential user in the vicinity of input element(keyboard) 16 or of the device as a whole. If the sensor 25 detects a user, the device according to the invention is activated in order to communicate with the potential user, for example through the loudspeaker 29, a possible text being: "Test and use our product information system". On the one hand, this eliminates the continuous extraneous noise which is so unpleasant for sales staff. On the other hand, a user present within a radius of two meters from the device is addressed directly, without annoying other persons in the store. The sensor 25 may, like the input element 16, also be connected directly to the computer 10, without passing through the interrogator unit 14.

In one advantageous configuration, the additional memory 26 is used as an intermediate memory for audio signals stored, in particular, on the video disc of the storage unit 4, which audio signal may be stored when a picture sequence is played back and released accordingly when a still picture is displayed. It is known that, according to television standards, audio signals can also be recorded, in parallel with video signals, on two soundtracks for stereo sound reproduction. If only one soundtrack (mono-reproduction) is used for picture sequences, audio signals for still pictures may be stored on the second soundtrack. As indicated by a connection 27, when a picture sequence is being run, the audio signals are fed to the intermediate memory 26. If a still picture is called up from the storage unit 4, a signal is simultaneously fed to the intermediate memory 26, in order to call up the audio signals associated with the still picture. In an advantageous alternative arrangement, moreover, audio signals are stored on lines between individual pictures or half pictures. The signal density in such intermediate lines is considerably greater than in parallel soundtracks and, furthermore, stereo reproduction is a simple matter.

Figure 2:
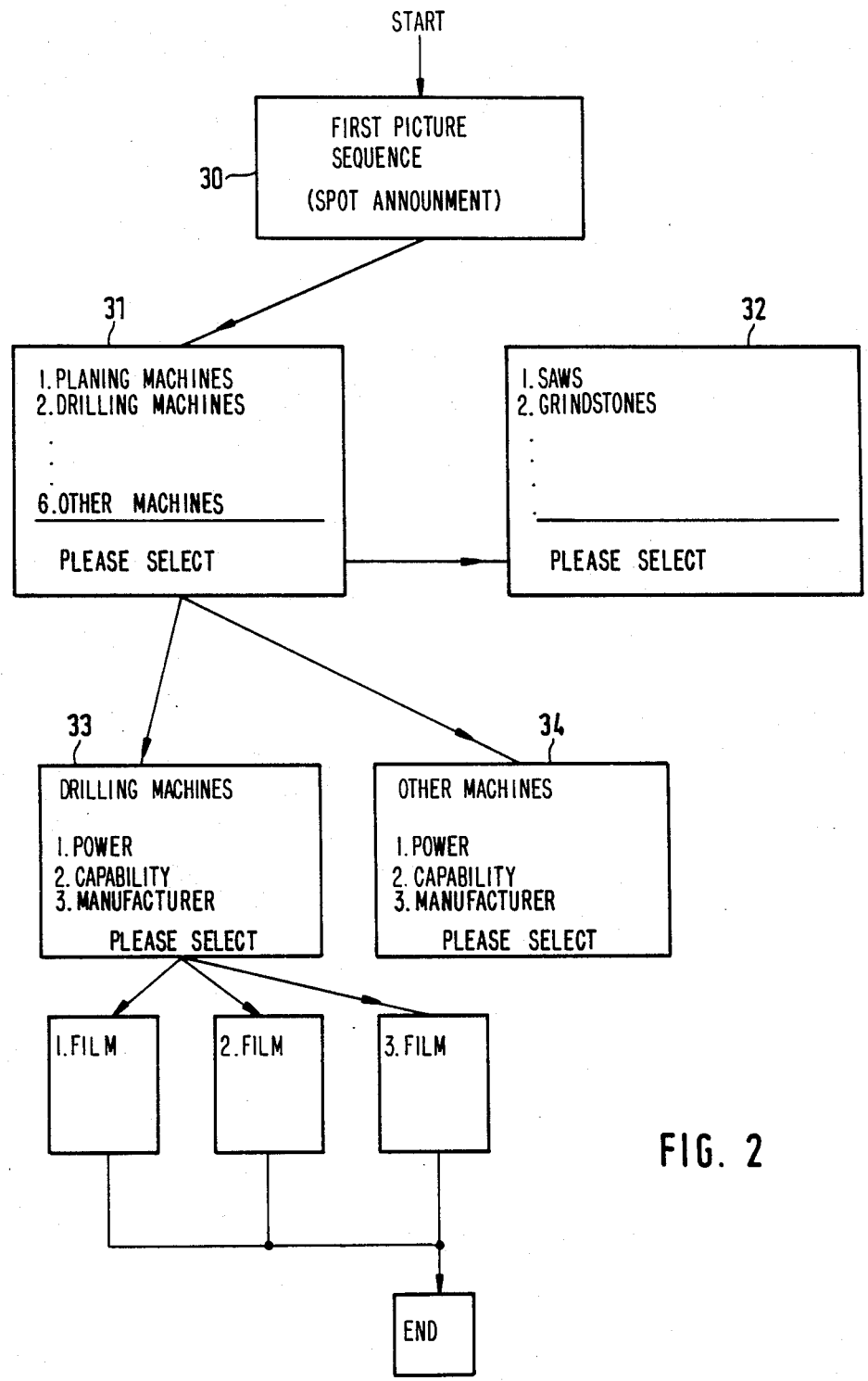
FIG. 2 is a diagrammatical representation of the build-up and sequence of various pieces of information and picture sequences.

FIG. 2 illustrates the principle of the flow plan with the pictures and picture sequences to be displayed. After the device has been switched on, or after the forward key 20 has been actuated, or through the sensor 25, a first picture sequence containing a brief spot announcement regarding the device and the operation thereof is called up from the video disc by means of the control unit 8, and is represented by a block 30. After a predetermined time, or after the above-mentioned forward key 20 has been actuated, the next picture, corresponding to a block 31 is displayed on the monitor 6. The user can select, for example, six types of machines, a single number being associated with each machine type. The user has only to actuate the key associated with the number corresponding to the desired machine type, in order to call up additional information on this machine. It is important that only a single number, letter or symbol be fed in and not multi digit section numbers or the like, in order to facilitate the use of the device and to reduce the risks of errors. A further picture, corresponding to a block 32, with another selection display covering other machines, can be offered to the user on the same hierarchical plane by feeding in the number 6 in the example illustrated on FIG. 2. On the other hand, if the user feeds in the number 2, a selection display concerning drilling machines in the example illustrated on FIG. 2 appears on the monitor 6, which display corresponding to a block 33 and he can then select a drilling machine according to the manufacturer, power, application, etc.. Again, only a single number is fed, by means of a key of the input element 16, to the control unit 8, in order to call up the desired film. It should be pointed out that FIG. 2 is merely a basic representation of individual blocks, pictures or picture sequences and that additional blocks may be added, if required, at the desired locations. When the film comes to an end, corresponding to a block 35, the operation returns to the first block 30.

Figure 3:
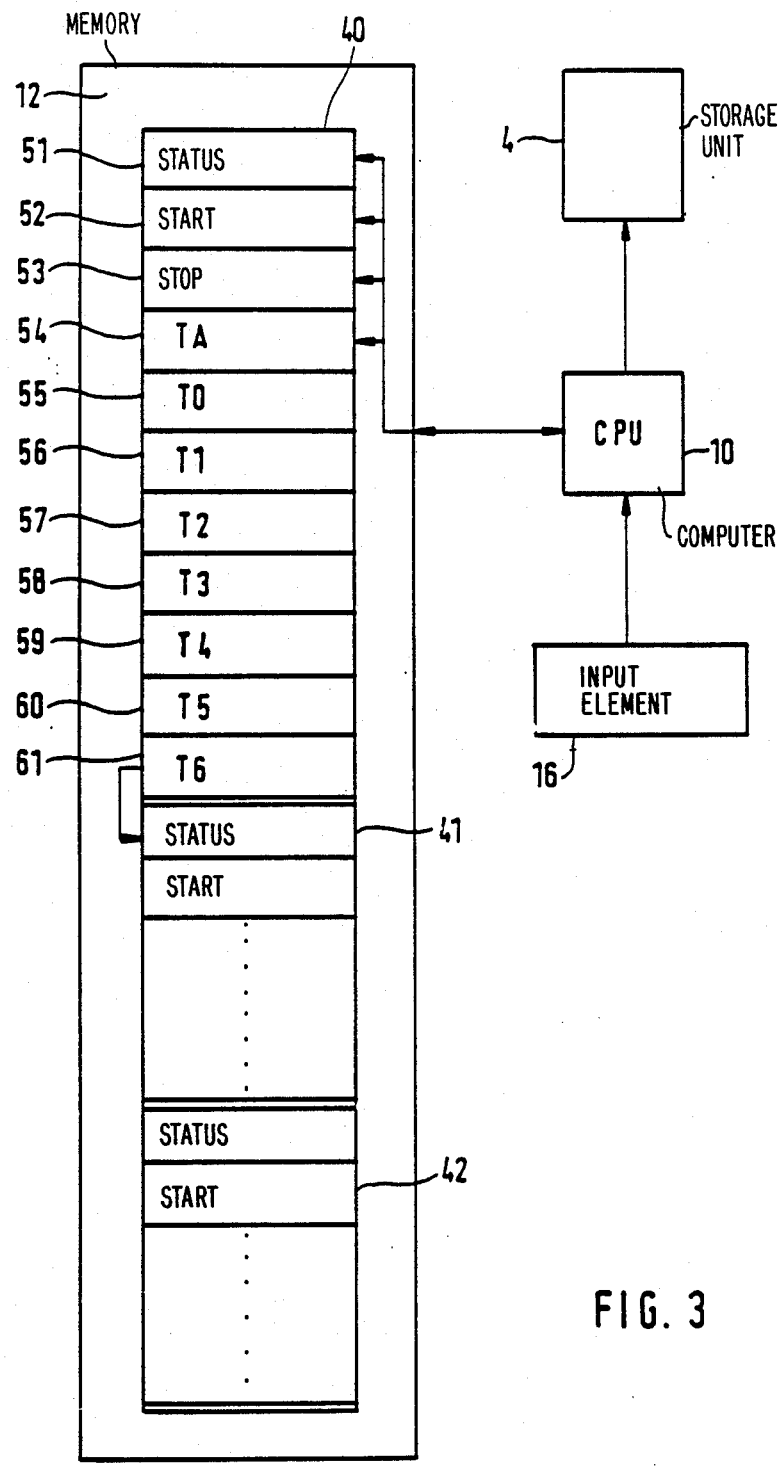
FIG. 3 is a basic representation of the status blocks contained in the memory and of the connections thereof.

FIG. 3 is a basic representation of the memory 12 in which status blocks 40, 41, 42 are stored. The status blocks are of the same structure and are used to list a specific sequence of commands. For example, up to 250 status blocks of this kind may be listed in the memory 12 but, for the sake of clarity, only the first three ones will be described. A first memory location 51 of each status block contains the address of the status block, while the next two locations 52, 53 contain address signals for starting and stopping a picture sequence or a picture in the storage unit 4. The address signal "start" carries the number of the first picture of a sequence, while the address signal "stop" carries the number of the last picture of a sequence. The corresponding pictures and numbers are stored in storage unit 4. If the address signal "start" is the same as the address signal "stop", the display screen will always show the same picture i.e. a still. A memory location 54 is used for key interrogation TA. For example, if only three of the following keys to be explained are occupied with an address signal or a pointer, it is ensured that appropriate information will be given to the user, even if an unoccupied key is actuated. The memory locations 51 to 54 are interrogated consecutively by the computer 10. The relevant picture is therefore called up directly from the storage unit 4 through the address signal in the memory location 52. If it is assumed that the address signal of a picture corresponding to the block 31 in FIG. 2 is contained in the memory location 52, and that the same address is stored in the location 53, then the picture corresponding to the block 31 will be offered by the monitor 6. According to block 31, six different keys are associated with one memory content. If a key, for example key 57, is then incorrectly actuated, this will be determined by the key interrogation 54 and an acoustic signal may be released through the loudspeaker 29 or a corresponding instruction may appear on the screen 2 of the monitor 6.

Memory locations 55 to 61 are associated with keys 0, 1, 2, 3, 4, 5, 6. If key 6, for example, is actuated, the address of the next status block 41 is released by a pointer T6. In the example shown on FIG. 2, the address signals "start" and "stop" of the block 41 would correspond to the block 32. On the other hand, if for example key 2 of the input element 16 is actuated, the address of the next status block 42 is released by pointer T2. The number of a picture corresponding to the block 33 in FIG. 2 is moved with the address signal "start" and the address signal "stop" in the storage unit 4. If, on the other hand, the zero key is actuated, the address of the preceding status block is released and this is again interrogated by the computer 10. All the status blocks shown here by way of example are of the same design and list the memory addresses in the same way, at least the three first memory locations being automatically interrogated by the computer 10 within the scope of the present invention. The following memory locations are provided for key interrogation, it being possible to move to the desired status block in the memory according to the address of the respective memory location fed in. It will be seen that it is possible to move, in this extremely clear way, with jump instructions, branching, or pointers, to the desired preceding or following memory location in this kind of listing.

The embodiments of the invention in which an exclusive property or privilege is claimed are defined as follows:

1. An information storage device comprising:
   a storage unit for storing information at a plurality of locations each addressable by means of an information address;
   an input element provided with a plurality of selectively actuable selection members;
   a control unit memory including a plurality of memory locations grouped to form a plurality of identical, addressable status blocks in which command sequences which can be predetermined are stored, each status block comprising a first group of memory locations including an initial memory location storing a status block address signal by which the respective status block is addressed, at least one subsequent memory location storing an information address signal and a selection member interrogation memory location, said subsequent memory locations being successively interrogated by a computer to release stored information address signals when said status block is addressed through the status block address signal stored in said initial memory location, each status block further comprising a second group of memory locations respectively associated with corresponding ones of said selection members, at least one of the memory locations of said second group storing an address signal for a further status block, and said selection member interrogation memory location storing information for determining which of said memory locations of said second group do not contain an address signal for a further status block;
   means connected to said input element and to said control unit memory for causing release, out of one of the status blocks actually called by said computer, of a status block address signal stored in one memory location of said second group of said called up block associated with one of the selection members, in response to actuation of said one selection member;

said selection member interrogation memory location being interrogated in sequence by said computer after said subsequent memory locations to recognize memory locations of said second group which contain an address signal for a further status block and memory locations of said second group which do not contain an address signal for a further status block;

said computer being connected to said control unit memory to have access to said command sequences of the status blocks and to be responsive to released information address signals in order to control release of information from the storage unit and to released status block address signals in order to address further status blocks in response to actuation of said selection members; and a display unit connected to the storage unit to display information released from the storage unit.

2. A device according to claim 1, wherein said plurality of selection members is a plurality of keys.

3. A device according to claim 1, in which command, address and functional signals are listed one after the other in the memory, and in which the computer comprises means for consecutively interrogating these signals, and for moving them through branches, pointers and jump instructions to preceding and following memory locations.

4. A device according to claim 1, in which the input element comprises means for delivering an input signal upon actuation of one of the selection members, and in which address and functional signals are stored in the memory and are adapted to be called up by the computer, said information device further comprising an interrogator unit including means for determining in response to said input signal which selection member of the input element has been activated and means for causing activation of the memory to release the desired one of said signals stored in the memory.

5. A device according to claim 1, wherein each status block comprises signals adapted to be called up by the computer for producing a still picture on the display unit.

6. A device according to claim 1, wherein each status block comprises signals adapted to be called up by the computer for producing picture sequence on the display unit.

7. A device according to claim 1, further comprising a standardized interface interposed between the storage unit and a control unit including said memory and computer.

8. A device according to claim 7, wherein said standardized interface is a V-24 interface.

9. A device according to claim 1, further comprising at least one additional memory connected to a control unit including said memory and computer.

10. A device according to claim 9, wherein said additional memory comprises means for storing textual information.

11. A device according to claim 9 wherein said additional memory comprises means for storing audio information.

12. A device according to claim 9, comprising a mixing stage interposed between on the one hand the said two memories, and on the other hand the display unit.

13. A device according to claim 9, in which the additional memory serves as an intermediate memory for information stored in the storage unit, which information being stored when a picture sequence is played back and being released accordingly when a still picture is displayed.

14. A device according to claim 13, wherein the information to be taken into the intermediate memory is stored in a sound track in parallel with the pictures of a picture sequence stored in the storage unit.

15. A device according to claim 13, wherein the information to be taken into the intermediate memory is stored in individual lines between pictures stored in the storage unit.

16. A device according to claim 13, wherein the information to be taken into the intermediate memory is stored in individual lines between half-pictures of a picture sequence stored in the storage unit.

17. A device according to claim 1, wherein corresponding memory locations of said second group in every status block are each addressed by the same signal generated in response to actuation of the same selection member of said input element, and each status block contains a memory location for an interrogation signal in order to test whether a memory location of said second group addressed by actuation of one of said selection members contains an address signal for a further status block.

18. A device according to claim 1, wherein each status block contains in said subsequent memory locations of said first group, a start information address signal and a stop information address signal for visual image information stored in said storage unit.

19. A device according to claim 1, wherein in said first group of memory locations in each status block, the address of the respective status block is stored in a first memory location, the address signal of an initial image of a sequence of images which can be called up from the information storage is stored in a second memory location, the address signal of a final image of said sequence of images is stored in a third memory location, and information for determining which memory locations of said second group which are occupied by addresses of other status blocks is stored in a fourth memory location, said first, second, third and fourth memory locations being automatically interrogated by the computer when the respective status block is addressed.

* * * * *